No. 810,826. PATENTED JAN. 23, 1906.
J. D. VAUGHAN.
LOG HOOK.
APPLICATION FILED JAN. 7, 1905.
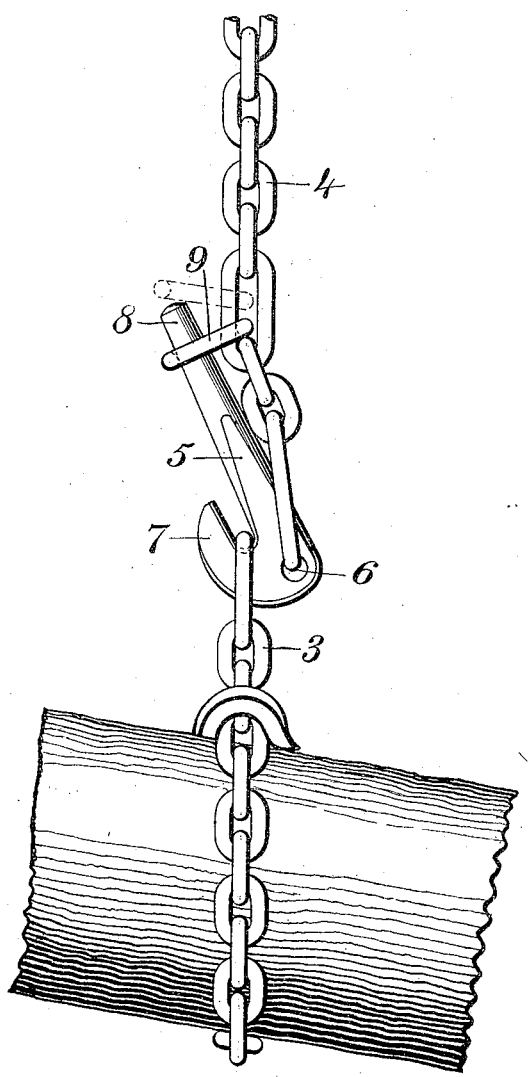
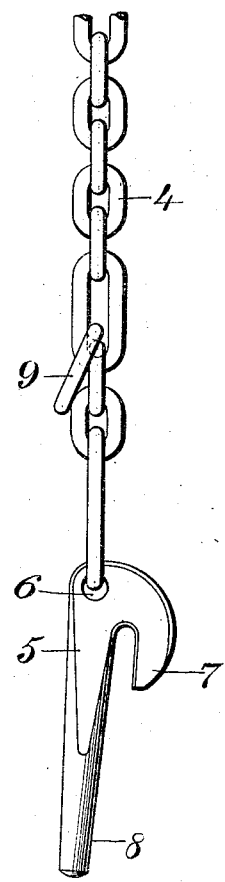
WITNESSES:
L. Almquist
A. F. Fay
INVENTOR
James D. Vaughan
BY
ATTORNEYS

UNITED STATES PATENT OFFICE.

JAMES DICKSON VAUGHAN, OF ZWOLLE, LOUISIANA.

LOG-HOOK.

No. 810,826.     Specification of Letters Patent.     Patented Jan. 23, 1906.

Application filed January 7, 1905. Serial No. 240,118.

*To all whom it may concern:*

Be it known that I, JAMES DICKSON VAUGHAN, a citizen of the United States, and a resident of Zwolle, in the parish of Sabine and State of Louisiana, have invented a new and Improved Log-Hook, of which the following is a full, clear, and exact description.

My invention relates to a log-hook; and the principal object thereof is to provide means for securing logs and the like which can be readily disengaged to permit the weight supported to drop, even when a large weight is engaged by the device.

Further objects of the invention will appear in the course of the subjoined description.

Heretofore the principal objection to the log-hooks in use has been that when an excessive weight was supported it added to the difficulty of disengaging the hook from the weight. It is obviously desirable that this objection be overcome, for the heavier the log that is supported the more desirable is it that the device should be easily detached from it.

Reference is to be had to the accompanying drawings, forming a part of this specification, in which similar characters of reference indicate corresponding parts in both the figures.

Figure 1 is a side elevation showing a log supported by a device embodying the principle of my invention, and Fig. 2 is a similar view of the same after the log has been detached.

The log is preferably supported by a chain 3 or the like, which in turn is supported from a second chain or equivalent device 4. The second chain is provided with a body 5, pivotally connected therewith at a point 6 on the rear side thereof and provided with a hook 7 on the front. This body is also provided with an arm 8, extending to the front in substantially the direction in which the hook extends from the body and adapted to be engaged by a link 9, connected with the chain 4. This link is preferably engaged with the chain at one end and extends out to one side of the chain, so that the arm 8 can be easily slipped through it, as illustrated, and it is located at such a point on the chain as to provide for holding the hook 7 in operative position when the link is engaged with the arm.

It will be readily understood that the link can be knocked off from the arm, as shown in dotted lines in Fig. 1, and that the weight of the log on the hook will then pull the parts to the position shown in Fig. 2, entirely disengaging the log from the supporting means. This overcomes the principal objection to the previous inventions in this line, for no matter how heavy the log may be the arm 8 can be readily disengaged from the link 9 and then the hook will release the chain 3 automatically. It will also be noticed that the perforation 6 being at the back of and below the hook 7 the chain 3 can be engaged with the hook, the body 5 rotated, and the hook drawn up to tighten the chain, and that the arm 8 will be out of the way of both chains at all times, while the chains will not interfere with each other.

While I have illustrated and described a preferred embodiment of my invention, it will be readily understood that it is capable of embodiment in many other forms and is not limited to that shown, also that it can be used for any desired kind of hoisting purposes and is not limited to application to logs.

Having thus described my invention, I claim as new and desire to secure by Letters Patent—

1. A fastening device having a body provided with means for connecting it with a support located on the rear side thereof, and a hook and an operating-arm on the front side, said hook and arm being above said means when the hook is locked in operative position.

2. A fastening device having a body provided with means located on the rear side thereof for connecting it with a support, and an operating-arm and hook located on the front side of said body, the hook being located below the arm, whereby upon the rotation of the device about said means as a center from a position for engaging a load to a position for supporting a load, the path of movement of the hook will not cross the plane of the support.

In testimony whereof I have signed my name to this specification in the presence of two subscribing witnesses.

JAMES DICKSON VAUGHAN.

Witnesses:
   CHAS. W. BELL,
   JAMES E. TEWERY.